March 8, 1932.      B. FRIEDRICH      1,848,617

PARALLEL VISE, CHUCK, AND SIMILAR CLAMPING DEVICE

Filed May 12, 1930      3 Sheets-Sheet 1

Inventor,
Bruno Friedrich

March 8, 1932.  B. FRIEDRICH  1,848,617

PARALLEL VISE, CHUCK, AND SIMILAR CLAMPING DEVICE

Filed May 12, 1930  3 Sheets-Sheet 2

Inventor
Bruno Friedrich,
By Henry Orth
atty

March 8, 1932.  B. FRIEDRICH  1,848,617

PARALLEL VISE, CHUCK, AND SIMILAR CLAMPING DEVICE

Filed May 12, 1930   3 Sheets-Sheet 3

Inventor,
Bruno Friedrich
By Henry Ooth Jr
Atty

Patented Mar. 8, 1932

1,848,617

UNITED STATES PATENT OFFICE

BRUNO FRIEDRICH, OF VIENNA, AUSTRIA

PARALLEL VISE, CHUCK, AND SIMILAR CLAMPING DEVICE

Application filed May 12, 1930, Serial No. 451,664, and in Great Britain May 16, 1929.

The improvements in parallel vises, chucks and the like which constitute the subject matter of the present invention have reference to means tiltable members, as commonly used, in tools of this kind, for enabling the work when being clamped, to be simultaneously retracted or drawn downwards towards the bed of the vise, or the base of the chuck and thereby pressed firmly against such bed or base, so that the work is not only rigidly clamped between the surfaces of the jaws whilst being operated upon but is also constantly pressed against a surface situated at right angles to the said jaws and thus held immovably all the time.

In parallel vises, chucks and the like of the type referred to, no abrupt warning is given workmen when the pressure jaws have reached their correct end position in which the rotation of the spindle or the like, which moves the blocks of the vise towards the pressure jaws clamping the work, should be stopped. For this reason in parallel vises of this known type, overrunning of the correct end position, by the pressure bodies occurs when the rotation of the spindle is not stopped, whereby the desired clamping effect is annihilated.

This serious drawback is obviated according to the invention by the provision of pressure bodies comprising an edge projecting laterally towards the pressure jaw, while the pressure jaw is provided on its rear face with a shoulder or an angular recess so arranged in relation to the said edge of the pressure body, that when the latter has almost reached the limit of its depressed position the said edge becomes seated in the angle of the shoulder or angular recess of the pressure body. On further rotation of the spindle, pressure is transferred from the block to the pressure jaw in the said angle of the shoulder or angular recess, so that a considerably greater resistance will be felt at the screw spindle whereby it is indicated to a workman that the terminal position has been reached.

In the drawings are shown by way of example, a number of constructional embodiments of the invention as applied to a parallel vise of which, for the sake of simplicity, only one of the two pressure jaws is shown, together with the block appertaining thereto.

Fig. 1 of these drawings shows a form of construction embodying a rotatable member.

The fundamental idea of the invention will now be described with reference to the diagrammatic Figures 1 and 2 of the accompanying drawings, which show one of the pressure jaws $a$ and one of the blocks $d$ of the vise, chuck or the like, which block acts upon said pressure jaw by being forced thereagainst. In order that the pressure jaw $a$ may exert a downwardly acting pull when this movement takes place, there is inserted between the two parts $a$ and $d$ (see Fig. 1) a roller-like device $b$, the cylindrical surface of which is cut away to form an angle. This device $b$ is carried in a cylindrical recess $c$ in the block $d$ and the pressure jaw $a$ is bevelled off, as at $e$, the bevel being turned towards the angular recess in the roller device and making corresponding angles with the boundary surfaces $f$ and $g$ of the angular recess.

If the block $d$ be pushed towards the pressure jaw $a$ the lower edge of the bevelled off portion $e$ will first bear against the surface $f$ of the roller device $b$, so that this latter will be rotated in its bearing $c$ in the direction indicated by the arrow 1. The other surface $g$ of the roller device consequently presses (in the direction of the arrow 2) against the upper edge $i$ of the bevelled off portion $e$ or against a shoulder $k$ on the pressure jaw $a$ adjoining said bevelled off portion, thereby forcing said pressure jaw downwards. Thus, after the jaw has come into contact with the work, the two together are pulled down on to the base surface $m$.

In order to hold the parts fast in the clamping position various means such as eccentrics, oblique slots, guide bars, or helical or leaf springs may be used. To increase the action of the roller device $b$ on the pressure jaw $a$ there may also be inserted, as shown in Figure 2, between the block $d$ and the pressure jaw $a$, a tilting member $n$ of prismatic shape in cross section, one of the lateral surfaces of which, when the device is at rest, bears against a shoulder $o$ on the pressure jaw $a$, the opposite lateral surface thereof bearing against a projection $p$ on the block $d$.

When the block $d$ is pushed towards the pressure jaw $a$ this tilting member is tilted on its two diametrically opposite edges which engage respectively with the shoulder $o$ of the pressure jaw and with the interior angle of the projection $p$ on the block and while the block is pushed up against the pressure jaw the latter is simultaneously forced downwards and presses the clamped piece of work against the base surface.

Figure 1:
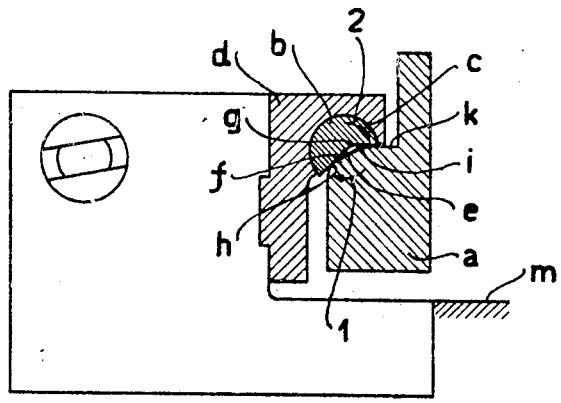
Figure 2:
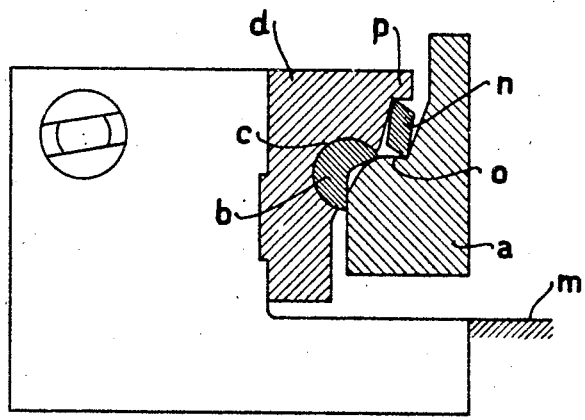
Fig. 2 shows another construction in which both rotatable and tiltable members are interposed between the pressure jaws and the sliding block.

In the roller and tilting devices shown in Figs. 1 and 2 which act on the pressure jaws $a$ by the block $d$ being pushed towards the said jaws by means of a screw spindle or the like, no abrupt warning is given to the workman when the rotation of the spindle or the like should be stopped, owing to the proper clamping action having commenced.

Figure 3:
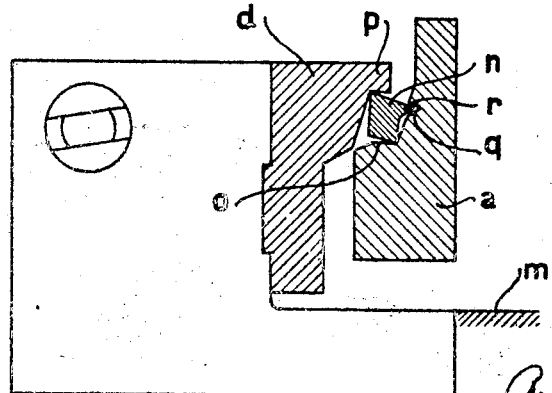
Fig. 3 shows a construction with a tiltable member only.

According to the constructional form shown in Fig. 3 only a tilting device $n$ is interposed between the block $d$ and the pressure jaw $a$ and this device is mounted in the same way as in the constructional form shown in Fig. 2. The tilting device $n$ is substantially rectangular in shape and is provided with a wedge-shaped nose $r$ which projects laterally towards the pressure jaw $a$. The rear face of the pressure jaw, facing the tilting device has an angular recess $q$ so arranged in relation to the nose $r$ of the tilting device, that when the latter has almost reached the limit of its edge-on position between the projection $p$ and shoulder $o$ the wedge-nose $r$ becomes seated in the angular recess $q$.

When the block $d$ is pushed towards the pressure jaw $a$ the first result, as in Figure 2, is the tilting of the tilting member $n$ and the consequent drawing downward of the pressure jaw while the screw spindle is being rotated. When the tilting member, the nose $r$ of which lies somewhat lower than the top edge which engages the interior angle of the projection $p$ has nearly reached the limiting edge-on position, further rotation of the screw spindle causes said wedge-shaped nose $r$ to seat on to the bottom face of the recess $q$, so that it tends to force the pressure jaw still further downwards. The workman turning the screw spindle will, therefore, suddenly feel a much greater resistance which will indicate to him that the correct amount of clamping action and drawing down of the pressure jaw has been reached. The wedge-shaped nose $r$ serves at the same time to secure and lock the pressure jaw in place.

Figure 5:
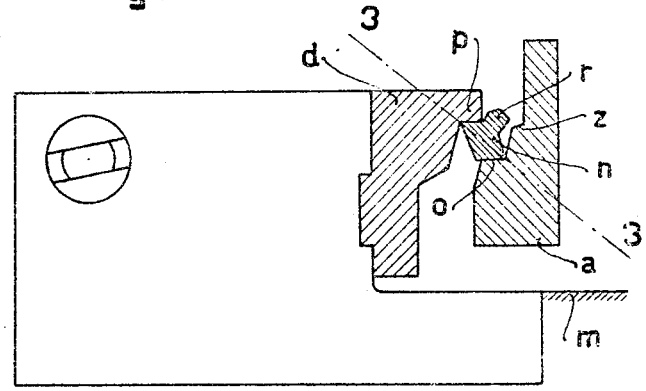
Figs. 5 to 7 illustrate in three different positions a somewhat modified constructional form of the tiltable member shown in Fig. 3.
Figure 6:
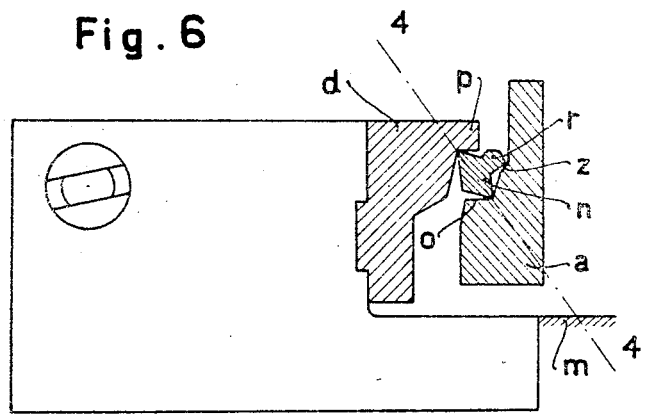
Figure 7:
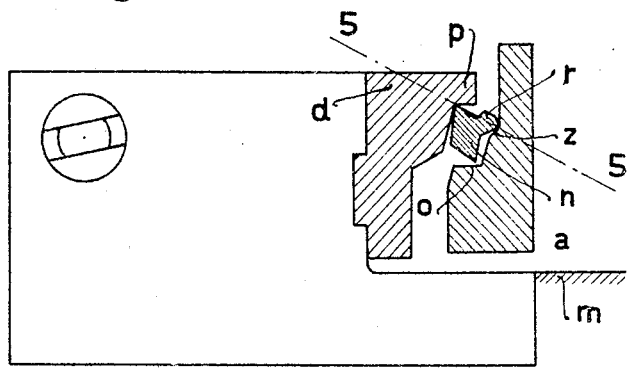

Figs. 5 to 7 show a somewhat modified constructional form of the tilting member shown in Fig. 3. The tilting member $n$, formed from a bar of prismatic cross section, lies, when in the position of rest shown in Fig. 5, with one of its sides bearing on the shoulder $o$ of the pressure jaw $a$, while its opposite side bears against a projection $p$ on the block $d$. This tilting device $n$ is also provided with a stout projection, or nose $r$ which extends laterally towards the pressure jaw $a$, while this latter, in addition to being provided with the shoulder $o$, also has an additional inclined shoulder $z$, on which the said nose $r$ is adapted to bear, as soon as the tilting member has been tilted nearly to its limiting position.

When the block $d$ is moved towards the pressure jaw $a$ or towards the work to be clamped, that is to say, moved from the position of rest shown in Fig. 5, the prismatic bar $n$ tilts about the two diametrically opposed edges thereof which bear against the shoulder $o$ of the pressure jaw and the inner angle of projection $p$ on the block. A straight line passing through these edges is indicated at 3—3 in Fig. 5. The tilting movement referred to causes the pressure jaw to be forced downwards and on continued rotation of the screw spindle the bar $n$ is further tilted, the nose $r$ on the latter gradually passing over the shoulder $z$ of the pressure jaw. Fig. 6 shows the position of the tilting member, shortly before its nose $r$ comes into contact with the shoulder $z$. At this stage pressure is transferred from the block $d$ to the pressure jaws $a$ along the direction indicated by the line 4—4 in Fig. 6. On further rotation of the screw spindle the nose $r$ comes into contact with the shoulder $z$ of the pressure jaw $a$ and tends to force the said jaw still further downwards.

Fig. 7 shows the terminal position of the tilting member in which the opposite edges connected by the line 5—5 engage in the inner angle of the projection $p$ and in the shoulder $z$ of the pressure jaw respectively. When this position is reached considerably greater resistance will be felt at the screw spindle thus affording tangible evidence that the terminal position has been arrived at and, therefore, the correct amount of clamping action and retraction of the pressure jaw produced. It can also be seen from Fig. 7 that the nose $r$ holds the pressure jaw securely in position and locks it thus preventing the clamped work from yielding or slipping.

Figure 8:
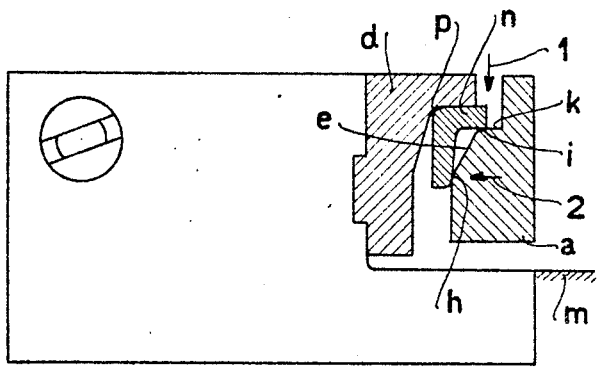
Fig. 8 shows yet a further modification of the tiltable member according to this invention.

Finally Fig. 8 shows a further constructional form of vise constructed according to this invention. $a$ again denotes one of the pressure jaws and $d$ is the corresponding sliding block of a parallel vise. Between these two parts is mounted an angle piece $n$ one limb of which, in the position of rest, bears against the projection $p$ on the block $d$ the extremities of its limbs then lying opposite the edges $h, i$ of the bevelled off part $e$ of the pressure jaw.

If the block $d$ be forced towards the pressure jaw $a$ the lower edge $h$ of the bevelled off part $e$ presses first against the vertical limb of the angle piece $n$ (in the direction of the arrow 2) causing the latter to rotate about that edge which is engaged in the angle of the projection $p$ on the block. As the result of this the other limb of the angle piece presses (in the direction indicated by the arrow 1) upon the upper edge $i$ of the bevelled off part $e$ of the pressure jaw and against the surface of the shoulder $k$ adjoining said edge. In this way the pressure jaw is forced downwards, so that after coming into contact with the work, it is drawn down with this latter on to the surface $m$ of the base.

Figure 4:
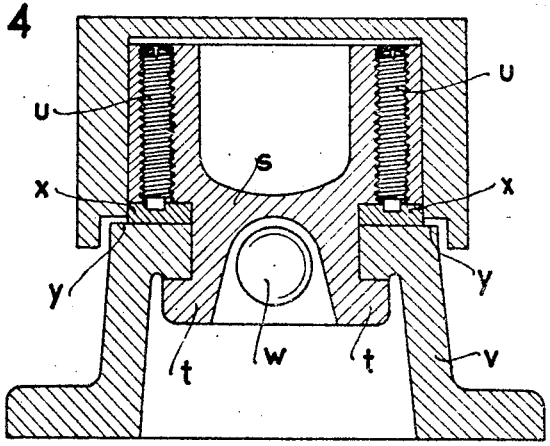
Fig. 4 shows a cross section through the vise.

To enable the sliding blocks to be attached to the bed of the vise, or to the base surface of the chuck or other clamping device the underside of each block may be furnished with ribs, which engage under the guide portion of the bed, so as to prevent the block from being lifted by the reaction of the turning moment set up, when the pressure jaw is drawn down. Preferably, the block $a$ or another block $s$ connected thereto is made in one with the ribs $t$ as shown in Fig. 4 and separate guide bars $x$ are inserted between the block $s$ and the upper side $y$ of the bed $v$. In the block $s$ screws $u$ are arranged on both sides of the screw spindle $w$, the shouldered down ends of these screws engaging in grooves in the guide bars $x$ and pressing the latter against the bed.

When applying the invention to any kind of chucking or clamping devices which ordinarily have at least two or, it may be, more than two blocks and pressure jaws, the latter are all provided with an arrangement according to one of the constructional forms herein described.

Figure 9:
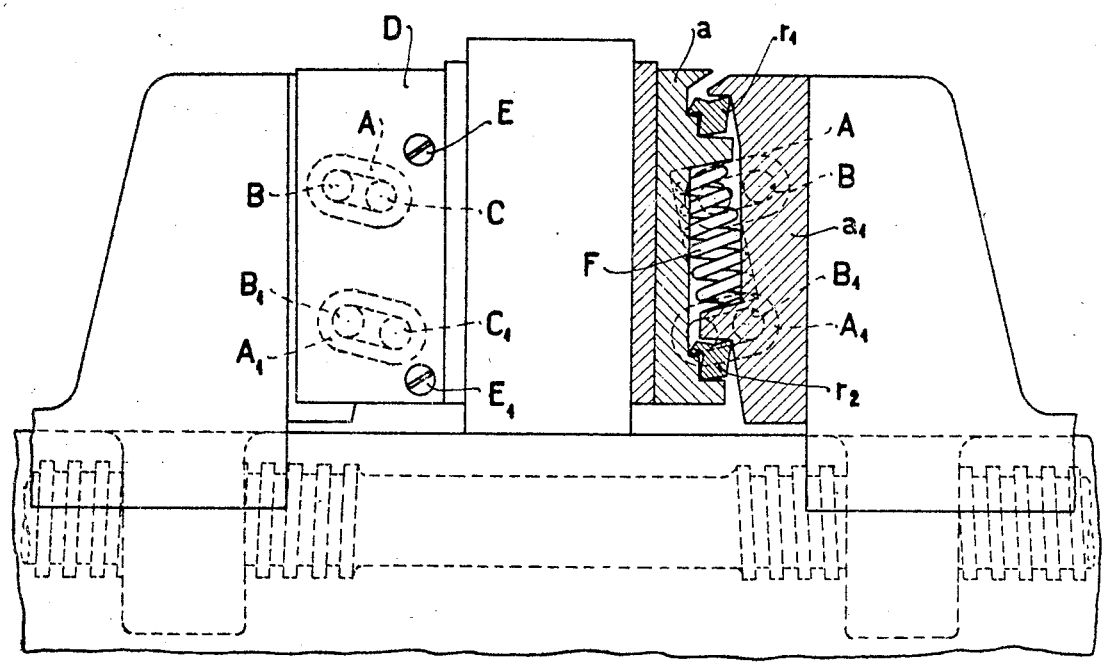
Fig. 9 shows a construction forming a separate unit adapted to be inserted in parallel vises, chucks and the like of any known type.

Fig. 9 shows in an elevation view a construction forming a separate unit adapted to be inserted in parallel vises, chucks and the like of any usual type. In the embodiment, shown in Fig. 9, two tilting members $r_1, r_2$ are inserted between the outer pressure jaw $a$ and an inner pressure jaw $a_1$ which are connected by means of links $A, A_1$ for preventing the jaws to expand when the device is at rest. The links $A, A_1$ are mounted with one end on pin $B, B_1$ inserted in the inner pressure jaw $a_1$, while the other end of the links are mounted on pins $C, C_1$ riveted to cover plates $D$ provided at each side of the outer pressure jaw $a$ and connected thereto by means of screws $E, E_1$. The pivoting centers of each link are spaced with the same distance as the working wedge-shaped noses of each tilting member.

One or more coiled springs $F$ inserted between the two pressure jaws and bearing against suitable shoulders of the jaws serve to move upwards the jaws $a$ into the normal position.

It will be understood that the number of links and springs used in the device shown in Fig. 9 may be varied.

What I claim is:—

1. In a clamping device of the kind described, a bed, a block ($d$) slidably mounted on said bed, said block having a cylindrical recess ($c$), a rotatable member ($b$) having a cylindrical peripheral surface seated in said cylindrical recess, said rotatable member being provided with an angular recess having surfaces ($f, g$), a pressure jaw ($a$) having a bevelled portion ($e$) forming appropriate angles with the surfaces ($f, g$) and cooperating therewith so that when block ($d$) is forced toward the pressure jaw ($a$) the rotatable member ($b$) will be rotated in its cylindrical seat by the action of the lower edge of the bevelled portion ($e$) on the opposing surface ($f$) and will therefore be compelled to force the jaw downwards by surface ($g$) acting on the upper edge of the bevelled portion.

2. In a clamping device of the kind described, a pressure jaw provided with a rear face having a shoulder and an angular recess ($q$), a block ($d$) having a projection ($p$), a tiltable member mounted on the pressure jaw between said jaw and block, said member being angularly formed and provided with a nose ($r$) adapted to extend into the recess ($q$) of the jaw, the arrangement being such that when the tiltable member is moved near to its limiting edge on position, the nose acts on the pressure jaw at a point which is lower than the uppermost edge of the tiltable member which edge is engaged in the interior angle of the projection ($p$) of block ($d$), and whereby forward movement of the jaw imparts tilting movement to said tiltable member to thereby depress said jaw.

3. A parallel vise, chuck or similar arrangement, according to claim 2, characterized by the fact that the blocks ($d$), or parts ($s$) connected thereto, are made in one piece with the ribs, and separate guide bars being inserted loosely between the blocks and the upper side of the bed and said bars being pressed against said bed by screws ($u$) sunk in the blocks ($d$) or parts ($s$).

4. A pressure vise, said vise having cooperating jaws, a bed beneath said jaws, a pivotally seated block between the jaws, said block forming means whereby when the jaws are forced together one of said jaws will be forced towards the bed plate, a shoulder carried by one of said jaws, said shoulder being positioned whereby when the jaws are forced together it will cooperate with one of said jaws and limit the downward movement of the movable jaw towards the bed.

5. The combination with a parallel vise having cooperating jaws movable towards and away from each other, of a pressure device, said pressure device comprising a rotatable cylindrical member, rotatably mounted in one of the jaws and extending beyond one face thereof, the side of said rotatable cylindrical member beyond the face of the jaw being recessed, a bevelled shoulder carried by the other jaw in the path of said recess, said bevelled shoulder cooperating with one side of the cylindrical member within the recess thereof when the jaws are forced together for rotating the cylindrical member and causing the other side of the cylindrical member to engage the upper side of the bevelled shoulder and force its jaw downwardly.

6. The combination with a pivoted prismatic block having opposite shoulders in recesses of vise jaws movable towards each other for displacing one of said jaws laterally in relation to the other, of a shoulder carried by said prismatic block, said shoulder being in the path of a stop carried by one of said jaws and forming means for limiting the movement of the displaced jaw and tilting of the block.

7. The combination with a tiltable member disposed between cooperating vise jaws, said tiltable member having opposite shoulders engaging in recesses of the jaws, said tiltable member being of a width greater than the distance between the recesses when the jaws are apart whereby when the jaws are forced together, one of said jaws will be forced away from the other at a right angle to the direction of travel and a shoulder carried by said tiltable member and cooperating with a portion of the displaceable jaw for limiting the displacement of the jaw.

In testimony that I claim the foregoing as my invention, I have signed my name.

BRUNO FRIEDRICH.